US012661826B2

(12) United States Patent
Fakir et al.

(10) Patent No.: US 12,661,826 B2
(45) Date of Patent: Jun. 23, 2026

(54) SYSTEMS AND METHODS FOR NETWORKED BIOPRINTING

(71) Applicant: 3D SYSTEMS, INC., Rock Hill, SC (US)

(72) Inventors: Rahul Fakir, Rock Hill, SC (US); Nicholas Penney, Rock Hill, SC (US); Ricardo D. Solorzano, Rock Hill, SC (US)

(73) Assignee: 3D SYSTEMS, INC., Rock Hill, NC (US)

( * ) Notice: Subject to any disclaimer, the term of this patent is extended or adjusted under 35 U.S.C. 154(b) by 980 days.

(21) Appl. No.: 17/755,690

(22) PCT Filed: Nov. 3, 2020

(86) PCT No.: PCT/US2020/058680
§ 371 (c)(1),
(2) Date: May 5, 2022

(87) PCT Pub. No.: WO2021/091879
PCT Pub. Date: May 14, 2021

(65) Prior Publication Data
US 2022/0402163 A1 Dec. 22, 2022

Related U.S. Application Data

(60) Provisional application No. 62/930,606, filed on Nov. 5, 2019.

(51) Int. Cl.
*B28B 1/00* (2006.01)
*B33Y 50/02* (2015.01)

(52) U.S. Cl.
CPC .............. *B28B 1/001* (2013.01); *B33Y 50/02* (2014.12)

(58) Field of Classification Search
CPC ................................ B28B 1/001; B33Y 50/02
(Continued)

(56) References Cited

U.S. PATENT DOCUMENTS

2017/0083003 A1* 3/2017 Arisoy .................... G06F 30/00
2018/0067464 A1* 3/2018 Budge ................... B29C 64/386
(Continued)

OTHER PUBLICATIONS

International Preliminary Report on Patentability in International Application No. PCT/US2020/058680, dated May 19, 2022, 8 pages.

(Continued)

*Primary Examiner* — Mohammad Ali
*Assistant Examiner* — Joshua T Sanders
(74) *Attorney, Agent, or Firm* — DLA PIPER LLP (US)

(57) ABSTRACT

The present disclosure is directed towards systems and methods for controlling three-dimensional bioprinters. In some embodiments, a server system may provide a user interface that can be used by a user may able to provide three-dimensional bioprinter specifications. The server system may then be configured to generate command instructions compatible with a particular bioprinter and then transmit the command instructions to the indicated bioprinter. In some embodiments the disclosed systems and methods may eliminate the need for downloading drivers or bioprinter specific software onto a user computing device. In some embodiments the disclosed systems and methods may be configured for use in restricted internet access settings.

20 Claims, 14 Drawing Sheets

(58) Field of Classification Search
USPC ........................................................ 700/118
See application file for complete search history.

(56) References Cited

U.S. PATENT DOCUMENTS

| | | | |
|---|---|---|---|
| 2019/0010463 A1* | 1/2019 | Matheu | C07K 16/1081 |
| 2019/0086899 A1* | 3/2019 | Wang | B33Y 50/02 |

OTHER PUBLICATIONS

International Search Report of the International Searching Authority in International Application No. PCT/US2020/058680, dated Feb. 1, 2021, 2 pages.
Written Opinion of the International Searching Authority in International Application No. PCT/US2020/058680, dated Feb. 1, 2021, 2 pages.
Wang et al, "A collaborative and ubiquitous system for fabricating dental parts using 3D printing technologies", Healthcare, vol. 7, No. 3, Multidisciplinary Digital Publishing Institute, 20 pages,Sep. 6, 2019.

* cited by examiner

201

Projects [NEW]    203    Printers

△ L L E V I

205

△ L L E V I

Enter your printer's serial number
to add it to your account

Serial Number

ADD
▷ PRINTER

Cancel

> [º₀] Advanced

> GCODE CONSOLE
1003

⚠ Only use this if you're a gcode expert. Misuse can damage your printer.

Receive user instructions for operating the bioprinter. 1101

Generate a path plan based on the received instructions. 1103

Generate machine language instructions for a bioprinter based on the generated path plan. 1105

Instruct a bioprinter in accordance with the generated machine language instructions. 1107

SYSTEMS AND METHODS FOR NETWORKED BIOPRINTING

REFERENCE TO RELATED APPLICATIONS

The present disclosure is a 371 of International Application Number PCT/US2020/058680, filed Nov. 3, 2020, which is related to and claims the benefit of US Provisional Application No. 62/930,606, entitled "SYSTEMS AND METHODS FOR NETWORKED BIOPRINTING" filed on Nov. 5, 2019, the contents of which are incorporated in their entireties.

TECHNICAL FIELD

The present disclosure relates to hardware and software components associated with networked bioprinting.

BACKGROUND 3D bioprinting technologies allow for the fast fabrication of complicated biological structures for use in both scientific research and clinical applications. For example, 3D bioprinting may allow for the printing and patterning of cells into specific geometries in connection with drug screening, organ replacement and the like.

Conventional bioprinting technologies often require the download of drivers and software onto a user computing device in order to control a bioprinter. In conventional systems, there is no easy way to access updates, and/or integrate from a cloud computing system. Further, in conventional systems the need to maintain different computer software versions can lead to complex and time-consuming version control issues. Therefore, bioprinters without networked capability and cloud computing are poised to have inefficiencies that prevent their adoption amongst researchers and scientists. Additionally, each bioprinter may be associated with particular software and commands. Thus, in conventional systems, researchers and clinicians may have to code for each particular bioprinter.

3D bioprinters require a high level of precision. For example, small differences in the temperature of the printing components, may result in variations in machine movement. Bioengineering applications like cell printing or fabricating cell-scale environments require well-defined, precise motion patterns that accommodate for the heating and variations in machine movement. In conventional systems, users had to manually edit low-level G-code for each bioprinter, in a process that was laborious, error-prone, and time-consuming.

SUMMARY

The present disclosure provides systems and methods for controlling three-dimensional bioprinters. In some embodiments, a server system may provide a user interface that can be used by a user to provide three-dimensional bioprinter specifications. The server system may then be configured to generate command instructions, designs, and data organization tools that may be compatible with a particular bioprinter and then transmit the command instructions to the indicated bioprinter. Accordingly, the disclosed systems and methods may eliminate the need for downloading drivers or bioprinter specific software onto a user computing device. Further, in some embodiments the described systems can compensate for the real-time changes in printing conditions that may impact the printing process.

In some embodiments, a system for controlling bioprinters includes a computing device having a user interface, a bioprinter, and a server system communicatively networked to the first computing device and the bioprinter. The server system may be configured to receive instructions from the computing device, generate command instructions for a bioprinter, and transmit the command instructions to the bioprinter. Optionally, the server system may be further configured to receive status data from the bioprinter, modify command instructions based on the received status data, and transmit the modified command instructions to at least one of the computing device and the bioprinter.

In some embodiments, a method may include the steps of: receiving, at a server system, user provided instructions from a computing device, generating, at the server system, command instructions for a bioprinter, and transmitting, at the server system, the generated command instructions to the bioprinter.

In some embodiments, a network-based system for three-dimensional bioprinting may include a server having a user specification to path data module, and a printer command generator module. The user specification to path data module may be configured to generate path plan data based on received user specification data, and the printer command generator module may be configured to generate bioprinter machine commands based on the generated path plan. Optionally, the server may include a printer to user-readable module configured to retrieve or receive data from the bioprinter, and provide status updates for the bioprinter to a user interface of a user computing device. Optionally, the network-based system may include a database communicatively coupled to the server, that is configured to store at least one of bioprinter configuration data, well plate configuration data, extruder configuration data, and material configuration data. Optionally, the server may be communicatively coupled to a user computing device configured to generate user specification data. Optionally, the user specification data may include at least one of printer configuration, well plate configuration, extruder configuration, material configuration, file configuration, print configuration, and reproducibility configurations. The system may also include a bioprinter communicatively coupled to the user computing device that is configured to generate a three-dimensional bioprint based on bioprinter machine commands generated by the server. The bioprinter may be communicatively coupled to the user computing device over at least one of a local area network and USB connection. The bioprinter may be communicatively coupled to the server and configured to generate a three-dimensional bioprint based on bioprinter machine commands generated by the server.

In some embodiments, a method for three-dimensional bioprinting may include the steps of: receiving, at a server system, user specification data indicative of a three-dimensional bioprint target from a user computing device communicatively coupled to the server system; generating, via the server system, a path plan for a bioprinter device based on the received user specification data; and generating, via the server system, bioprinter commands based on the generated path plan. User specification data may include at least one of printer configuration, well plate configuration, extruder configuration, material configuration, file configuration, print configuration, and reproducibility configurations. The method may also include the step of generating user specification data by input into a user interface displayed on a user computing device. Generating a path plan may also include the step of incorporating bioprinter characteristic data with the user specification data. Generating bioprinter commands may also include the step of splicing the path plan. The method may also include the step of applying the generated printer command data to a bioprinter communicatively coupled to the server system to print the three-dimensional bioprint target. Optionally, transmitting the bioprinter commands to the user computing device for application to a bioprinter communicatively coupled to the user computing device to print the three-dimensional bioprint target.

In some embodiments, a network-based system for three-dimensional bioprinting, the system may include a server comprising a user specification to path data module configured to generate a path plan data based on received user specification data, and a printer command generator module configured to generate bioprinter machine commands based on the generated path plan, and a user computing device communicatively coupled to the server, where the user computing device is configured to: generate user specification data and provide the user specification data to the server; receive bioprinter machine commands from the server; and control the operation of a bioprinter machine communicatively coupled to the user computing device by way of the bioprinter machine commands. Optionally, user specification data may include at least one of printer configuration, well plate configuration, extruder configuration, material configuration, file configuration, print configuration, and reproducibility configurations. Further, the bioprinter may be communicatively coupled to the user computing device over at least one of a local area network and USB connection. Additionally, the user specification to path data module may be configured to incorporate bioprinter characteristic data with the user specification data to generate the path plan. And the printer command generator module may be configured to generate bioprinter machine commands by splicing the path plan data.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 10 illustrates a ninth portion of a user interface in accordance with aspects of the present disclosure.

DETAILED DESCRIPTION

Figure 1A:
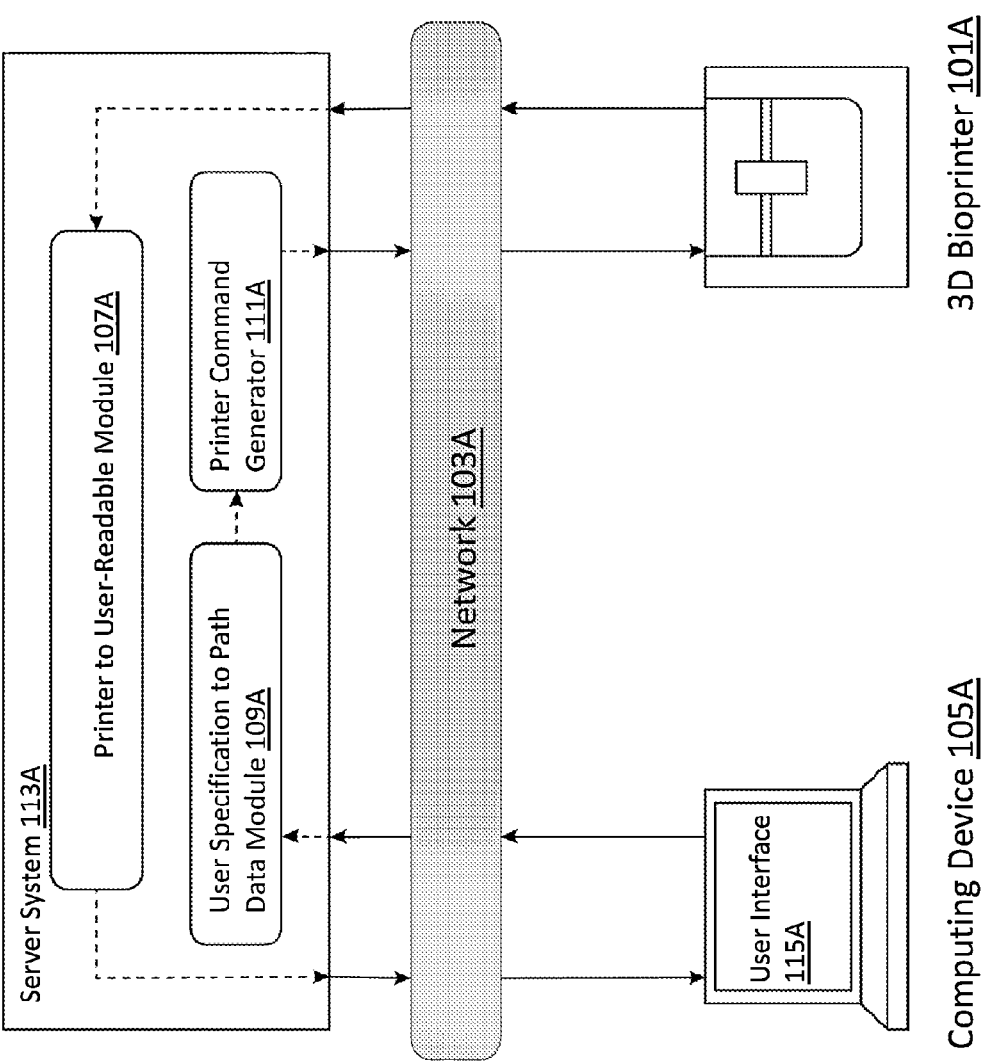
FIG. 1A illustrates the computer architecture of a system for controlling bioprinters in accordance with aspects of the present disclosure.

FIG. 1A illustrates the computer architecture of a system for controlling bioprinters in accordance with an aspect of the present disclosure. As illustrated, a server system 113A may be communicatively coupled with a computing device 105A and a three-dimensional (3D) bioprinter 101A. It is contemplated that in some embodiments the server system 113A may be coupled with a plurality of computing devices 105A, and/or a plurality of three-dimensional bioprinters 101A.

In some embodiments, the bioprinter 101A may be a three-dimensional bioprinter. In some embodiments, the 3D bioprinter 101A may be an Allevi® printer.

Network 103A may include or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. Network 103A may include an internet connection via Ethernet, Wi-Fi, another IEEE 802 protocol and the like.

In some embodiments, the computing device 105A may be a laptop, tablet, desktop device, smartphone, and the like. The computing device 105A may include a user interface 115A, such as an application, or website configured to interface with the server system 113A. The application and/or website may include a graphical user interface and the like.

The application or website configured to be accessed via the user interface 115A may be provide front-end access to a user to the server system 113A. The server system 113A may provide data, information, and structure for the user interface 115A.

The user interface 115A may be configured to display to a user state data indicating the status and configuration of one or more bioprinters 101A communicatively coupled to the server system 113A. Further, the user interface 115A may be configured to allow a user to enter instructions for operating the bioprinter. For example, the user interface 115A may be configured to receive 3D model data, shape definitions, computer-aided design (CAD) files, and/or command instructions.

Model data may include a 3D model generated by a CAD program in a standardized file format. Examples of standardized file formats include those compatible with stereolithography CAD, such as standard triangle language or STL. The model data may include geometric data which defines any arbitrary 3D shape the user wishes to bioprint. For example, if a user wanted to 3D print an object in the shape of an ear, the model data may include an STL file defining the shape of an ear. The systems and methods described herein may use the model data to generate a series of printer commands that are compatible with the bioprinter.

Examples of printer commands include moves in 3D space, start/stop extrusion, increase/decrease extrusion pressure, and the like, which when followed by a printer yield the desired 3D geometry.

Shape definitions may include sets of parameters which can be used to generate 3D geometry without the use of a CAD program. For example, parameters may include shapes, lengths, widths, and diameters (e.g. solid cylinder, 5 mm tall, 3 mm diameter). Shape definition parameters may be input by the user via the user interface and then passed to the path generation module (e.g., as a javascript object). The path generation module may be configured to receive the shape definitions and incorporate them into the path plan for the bioprinter.

Command instructions may include machine code instructions that are configured to be sent directly to the bioprinter to control various functions of the device. Command instructions may control the movement and settings that relate to the movement and positioning of the extruder and/or other components of the bioprinter. Commands may also be used to set variables, individual settings, or control individual components of a bioprinter (e.g., temperature, lights, acceleration). Command instructions may also be used for autocalibration and/or pressure control. Examples of command instructions may include, but are not limited to, extruder temperature, regulator pressure, start/stop extrusion, carriage movement in X/Y/Z 3D space, start/cancel extruder auto-calibration, set extruder calibration manually, enable/disable during/after print photo-crosslinking, start/pause/cancel a print, and the like.

Further, in some embodiments, the user interface 115A may be configured to include a graphical user interface, which is configured to accept command instructions provided by a user.

The server system 113A may include one or more modules. Modules, as discussed herein, may include hardware components, software components, and any combination thereof. In some embodiments, the server system 113A may include a printer to user-readable module 107A, a user specification to path data module 109A, and a printer command generator module 111A.

The server system 113A may include a physical or virtualized computing infrastructure. The server system 113A may include one or more server nodes residing on-premises or in a remote data center.

The server system 113A may be communicatively coupled to one or more databases storing information regarding bioprinters, such as serial numbers, extruder specifications, and the like. The database may also include information regarding the plates and other extruder surfaces capable of being used with each bioprinter.

For example, the server system 113A may be communicatively connected to public and private database. These communication channels may employ security measures to ensure the privacy of data in transit and general database communication. During the processing of a data request that requires information from a database, the respective database can be securely queried through communication channel. The server system 113A may pull database information related to the bioprinter print plan. For example, the server system 113A may pull data related to the optimal settings for the materials that will be used in a print, specific layouts of multi-well plates to be printed on, and the like. For example, when a user is printing with a specific material, the server system 113A makes a call to a connected database to pull the optimal temperature, pressure, crosslinking settings, and the like recommended to use to print that material. That information can be modified by the user in the user interface 115A (or left as-is), and is then sent to the printer command generator module 111A along with the 3D model(s) which are to be printed as received by the user specification to path data module 109A.

The printer to user-readable module 107A may be configured to receive state data from the bioprinter 101A and generate user-readable information based on the state data. The printer to user-readable module 107A may then be configured to update a website or application configured to be accessed by the user interface 115A on the computing device 105A with the status of the bioprinter 101A.

In some embodiments, the state data may include the data indicating the status and configuration of the bioprinter. For example, the state data may include (but is not limited to) the position (x-y-z coordinates), the temperature, pressure, and current status of the extruders. The state data may also indicate the quantity of materials left to extrude and the like. A non-exhaustive list of state data parameters may include the bioprinter model number and serial number, air feed supply pressure, system temperature, wellplate type and current well, active extruder, bed plate temperature and set point, during/after/manual photo-crosslinking settings, extruder X/Y/Z positions, type, connection status, calibration status, LED status, pressure, temperature and extrusion state, and the like.

The user specification to path data module 109A may receive instructions for operating the bioprinter from the user interface 115A. The user specification to path data module 109A may receive the 3D model data, CAD files, and/or command instructions via the user interface 115A, as discussed above. The user specification to path data module 109A may then determine the specific printer and related operational capabilities of the indicated printer. In some embodiments, the operational capabilities of the indicated printer may be retrieved from a database communicatively coupled to the server system 113A. In accordance with the operational capabilities of the printer, the user specification to path data module 109A may then generate a path plan for the printer that corresponds with the user provided instructions for operating the bioprinter. For example, if the user specifies a particular three-dimensional structure, the user specification to path data module 109A may determine the appropriate path plan that a bioprinter may take to generate the three-dimensional structure. In some embodiments the path plan may include a series of paths that an extruder of the bioprinter may take.

In some embodiments, a path plan describes the steps a bioprinter would have to follow to produce a desired outcome. While a user may indicate that the bioprinter should perform steps such as: "Start at the print bed origin, then begin extruding and move 5 mm up in the Y axis at a speed of 15 mm/second, then stop extruding," each step within the user provided description may include X/Y/Z position data to move to, speed of movement, turning extrusion on/off, changing temperature and/or pressure, turning photo-crosslinking on and off, and similar operations.

The user specified data sent to the printer command generator 111A by way of the user specification to path data module 109A may include the 3D geometry that is intended to be replicated by the bioprinter, as well as the parameters necessary to print using the desired material. The parameters necessary to print using the desired material may include specified temperature, pressure, wellplate type and size, crosslinking settings, bed plate temperature, etc. For example, a material that prints at a higher temperature may need to be printed at a higher print speed than a material that prints at a lower temperature to yield the same result. Additionally, different materials may require printing with a different extruder pressure, or using a larger or smaller extruder tip. Accordingly, the path data plan generated by the printer command generator 11A may differ based on the desired materials, although the user-specified 3D geometry plan (provided by the user specification to path data module 109A) is identical.

The path plan generated by the user specification to path data module 109 may then be provided to the printer command generator module 111 of the server system 113. The printer command generator module 111 may then generate machine language or g-code level commands for the particular bioprinter for each of the determined paths in the series of paths. The printer command generator module 111 may then instruct the bioprinter 101 in accordance with the determined printer commands.

While the path plan may provide a generic recipe for what a bioprinter should do to produce a specified geometric shape, the machine language/g-code commands are that precise commands that correspond to a specific printer. For example, while the path plan may specify "move 5 mm up in the Y axis at a speed of 15 mm/second", it may be represented as g-code for an Allevi printer as "G1 Y5 F900". Each step in the path plan has a corresponding g-code value, and the print command generator is capable of translating a path plan into g-code commands for a specific type of printer(s).

The path plan may be generated by a process known as "slicing." In a first step, 3D geometry data for a target bioprinted shape is loaded into the slicer, generally from an STL file or similar. In a second step, depending on the user-specified parameters to the path generator, the slicer takes a number of 2D horizontal cross-sections (slices) of the target bioprinted shape. The number of slices varies and is based on the user-specified print parameters, which depend on the material used, extruder tip size, etc. In a third step, the path generator, in printer command generator module 111A, determines the optimal "route" for the extruder of the bioprinter to travel in order to draw out the outline of the slice. The path generator may break down a single slice into as many steps as necessary to reproduce the shape. The number of steps required may be determined based on the material that will be bioprinted, as the material may define how fast the extruder needs to move at each step. In a fourth step, the interior portion of each slice can be left empty, or can be filled in with a 2D pattern. The interior portion and its respective plan can be defined by the user. Leaving the interior of all the slices empty will yield a hollow 3D print, while filling all the slices will create a solid 3D print. If the interior portion is to be filled, the path generator in the printer command generator 111A may add all the steps necessary to fill each slice. In a fifth step, all of the slices generated by the printer command generator 111A may be stacked on top of each other, from the bottom up, to create the final shape. The path plans generated for each slice are appended in sequence to yield the final path plan. In a sixth step, the path plan can be translated to the proper sequence of g-code commands for the printer that will be used. For bioprints in multi-well plates, the printer command generator module 111A which may generate g-code can also replicate a 3D shape over any combination of wells of the multi-well plate.

As opposed to conventional systems which may use a slicer to transform CAD drawings to g-code, the present disclosure is able to receive instructions for the desired print structure and bioprinter via the user interface and create a path plan. Advantageously, the path plan may be compatible with a variety of bioprinters and thus allow a user to work with more than one bioprinter. Further, as the present disclosure generates a path plan remotely of the user computing device 105, a user may move between computers. Further, the user is not required to download special driver software for each bioprinter the user may choose to use.

Conventional systems are often unable to generate an accurate path plan to create a desired shape due to the unpredictable nature of real-world materials. For example, a path plan that works for one material may not work with another, and finding the right combination of temperature, pressure, nozzle size, and the like, can be time-consuming and is frequently a process of trial-and-error. By contrast, the disclosed systems and methods are able to store a set of material presets which are known to work for the user specified materials, and the material presets can be automatically passed to the printer command generator module 111A so the user doesn't have to guess the best settings to use for a specific material. The printer command generator module 111A is also pre-configured to work well with specified bioprinters, which saves users additional effort and time.

An additional challenge in conventional systems is the inability to make multi-material bioprints.

Conventional slicing technology does not generally make multi-material printing very intuitive, however, the user interface and server-side application described herein, handles some of the more complex parts of multi-material prints, like defining which materials to use in which parts of the 3D shape, providing many benefits over conventional systems such as improved quality, accuracy, and timing of bioprints.

Figure 1B:
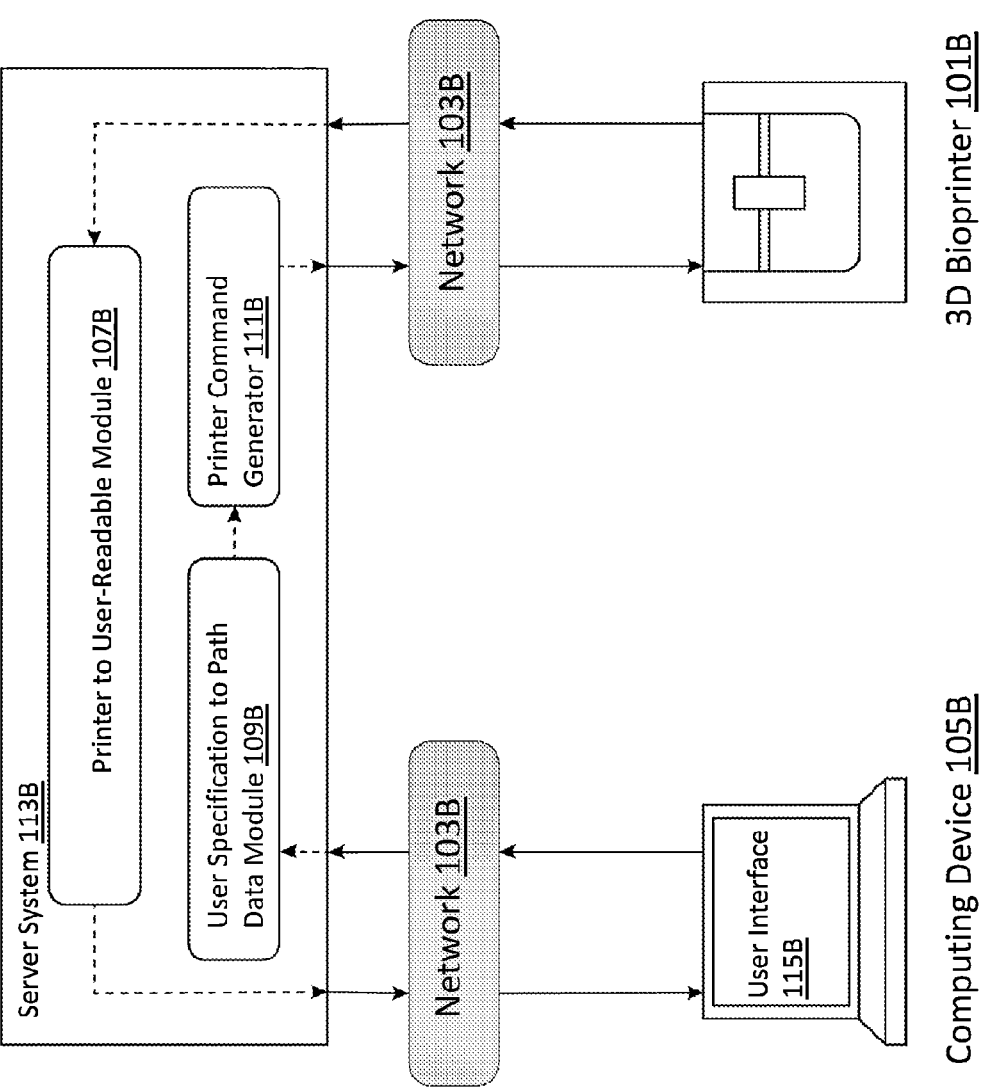
FIG. 1B illustrates the computer architecture of a system for controlling bioprinters in an internet-only configuration in accordance with aspects of the present disclosure.

FIG. 1B illustrates the computer architecture of a system for controlling bioprinters in an internet-only configuration in accordance with aspects of the present disclosure, analogous to FIG. 1A. In the embodiment depicted in FIG. 1B, both the user device and the bioprinter device may be configured to have network and/or internet connection. For example, as illustrated in FIG. 1B, the system may include a bioprinter or hardware device 101B, a network or internet connection 103B that provides access to a server system or cloud computing facility 113B. The cloud computing facility 113B may facilitate the transfer, processing, and/or storage of data required by user and printer devices to operate within the platform. The cloud computing facility 113B may include a service module such as a user specification to path data module 109B may be configured to receive user requests and commands and gather and the required data for the request response and initiate the translation of the request to machine code. The cloud computing facility 113B may also include a printer command generation module 111B configured to send the data to the bioprinter or hardware device 101B over the internet 103B. Examples of data sent to the printer or hardware data 101B may include command data. Further, the cloud computing facility 113B may include a printer to user-readable module 107B configured to periodically receive state data from the printer via an internet connection 103B. The printer to user-readable module 107B may be configured to process the data and place it in a suitable storage system that allows for users to read the data through the user interface 115B on the user computing device 105B.

In some embodiments, the configuration illustrated in FIG. 1B, may be an internet only configuration, where network 103B is an internet connection. Both the bioprinter 101B and the computing device 105B are connected to the server 113B infrastructure over the internet 103B. Communication between the user interface 115B and the server 113B infrastructure occurs over the internet 103B. This communication can include, but is not limited to reading, writing and updating user specifications and reading printer, extruder, well plate, bedplate, file and material configurations. Any communication between the user interface 115B and the printer 101B is relayed through the server 113B infrastructure. That is, any commands sent to the printer 101B from the user interface 115B may be sent to the server 113B infrastructure and further relayed to the printer 101B. Similarly, any data/state sent from the printer 101B to the user interface 115B will be sent to the server 113B infrastructure and then relayed through to the user interface 115B.

In a system built in accordance with the computer architecture illustrated in FIG. 1B, command instructions may be sent from the server infrastructure 113B to the bioprinter 101B over the internet. The command instructions may be transmitted in Transmission Control Protocol (TCP) packets over a TCP connection such as Message Queuing Telemetry Transport (MQTT) or Hypertext Transfer Protocol (HTTP).

Figure 1C:
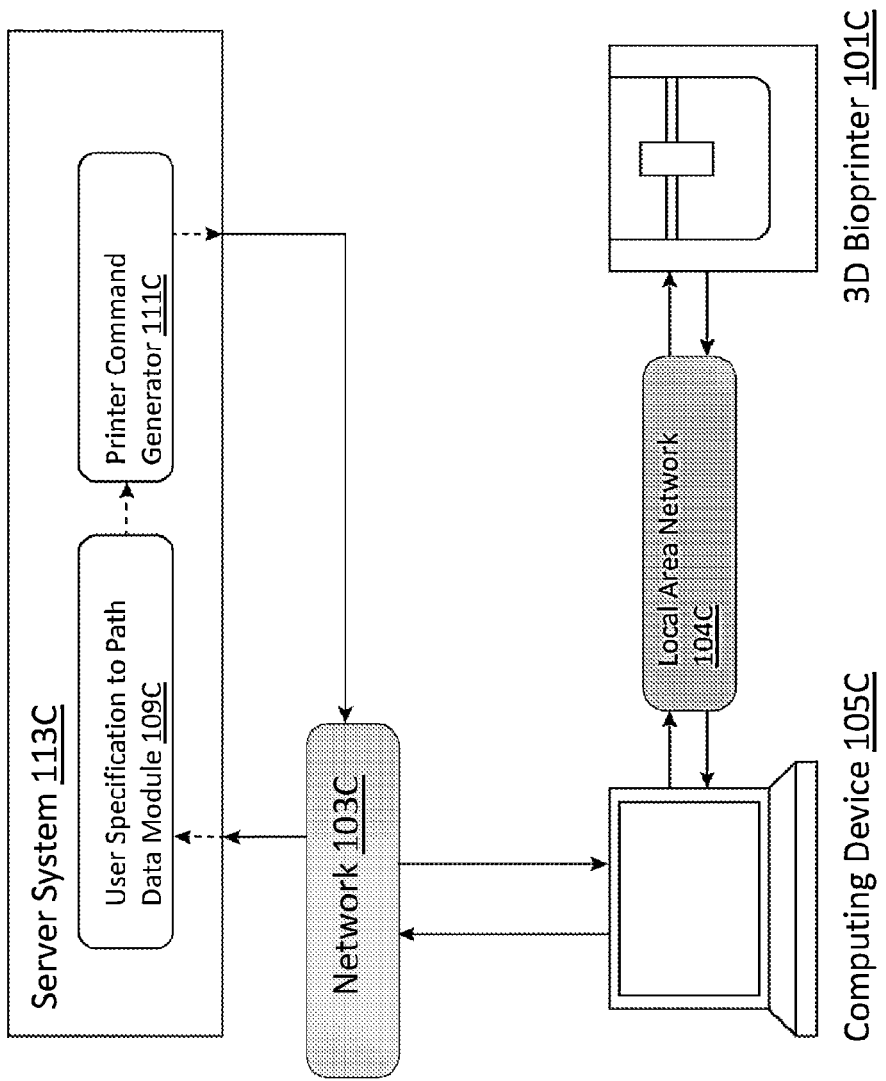
FIG. 1C illustrates the computer architecture of a system for controlling bioprinters in a hybrid configuration in accordance with aspects of the present disclosure.

FIG. 1C illustrates the computer architecture of a system for controlling bioprinters in a hybrid configuration in accordance with aspects of the present disclosure. The computer architecture for the hybrid configuration includes a bioprinter or hardware device 101C, a local area network 104C, a server or cloud-computing system 113C, a user specification to path data module 109C and printer command generator module 11C both located on the server system 113C. The server system 113C may be communicatively coupled to the computing device 105C via a network 103C. In the hybrid configuration illustrated in FIG. 1C, a separate local area network 104C may include a crossover cable configured for ethernet and/or USB enabled cable that is used to support a networked and/or serial data communication between two devices such as the bioprinter 101C, and a user computing device 105C such as a laptop or computer. The user computing device 105C may be configured to transfer data to and from the bioprinter via the local area network 104C.

The user specification to path data module 109C may be configured to receive user requests and/or commands. As discussed above, this data may include, but is not limited to, user specifications, and 3D model files, printer configurations, well plate configurations, extruder configurations, bedplate configurations and material configurations. This data may be used to read, update, and/or write user specifications used when a print path is created by the user specification to path data module 109C and then transformed into g-code or machine level commands by the printer command generator module 111C. The user specification to path data module 109 may also be configured to gather the required data for the requested response by consolidating all required parameters for print path creation.

The printer command generator module 111C may initiate the translation of the request to machine level code. This may involve, creating user specification data for a specific print, submitting the user specification data to the user specification to path data module 109C, generating path data at the user specification to path data module 109C, transmitting the path data to the printer command generator module 111C, slicing the 3D model files into a machine executable format and customizing the output based on the parameters in the user specification, at the printer command generator module 111C. Examples of user specification data includes, but is not limited to, 3D model files, printer configurations, well plate configurations, extruder configurations, bedplate configurations and material configurations.

The printer command generator module 111C may be configured to return the data to the user interface of the user computing device 105C which then sends the commands to the bioprinter 101C by way of the local area network 104C. The output from the printer command generator module 111C may include, but is not limited to sliced 3D model files and additional printer commands that are required for the current print path. This print path output data may be returned entirely as gcode or may be returned as a url that the user interface can use to request, from service module 111C, the output in gcode format. In some embodiments, the user-interface on user computing device 105C sends the output, in gcode format, to the bioprinter 101C through a local area network 104C including a USB cable. This gcode or machine level data instructs the bioprinter to execute the specified print.

In some embodiments no data is required to be stored on the computing device 105C however during the request, the user interface and/or user computing device 105C may store ephemeral data in a buffer or queue prior to it being sent to the bioprinter 101C. Once all the data has been sent to the bioprinter 101C, the ephemeral data is discarded and does not require any existence on the computing device 105C.

The embodiment illustrated in FIG. 1C may require the local computer device 105C to have an internet connection 103C, a web browser and access to a USB serial port. The stack may be designed to make use of USB drivers (e.g. FTDI USB drivers), common to most operating systems. In the event that the operating system does not have access to the USB driver, the driver may be downloaded and installed from the official driver source repository.

Any data that is required to be sent to the printer 101C is communicated through the Local Area Network/USB cable 104C by the user device 105C. Translation occurs at the data level allowing data formatted for the user device 105C to be translated into a format that can be sent over the Local Area Network/USB cable 104C. This translated format may be serial data or TCP packet data. The printer will recombine the formatted data into a format executable by the printer 101C and subsequently begin executing commands that are sent through.

For example, in accordance with the computer architecture illustrated in FIG. 1C, command instructions may be sent from the server 113C to the user computing device 105C. The user computing device 105C may then forward these commands over the Local Area Network/USB cable 104C to the bioprinter 101C. The command data may be transported in TCP packets and/or in serial packets.

The hybrid configuration illustrated in FIG. 1C may provide advantages over system architecture of conventional systems for bioprinting. For example, the bioprinter 101C is not required to be connected to the internet at network 103C. Instead, all bioprinter 101C communication is initiated from the user interface and user computing device 105C and is directed through a Local Area Network 104C which may be a USB cable. The computing device 105C running the user interface is the only component that requires an internet connection 103C and interfaces directly with the server infrastructure 113C and bioprinter 101C, relaying any data between these two components. The hybrid setup in FIG. 1C thus allows users that have poor internet connections and/or strict network requirements to have access to the same functionality as users who do not have these restrictions.

In some embodiments, a user may be able to alter the configuration of the system between the environment illustrated in FIG. 1B and that illustrated in FIG. 1C, having a single server infrastructure setup for both environments and allowing users to choose the setup that works best for their individual requirements. In other words, a bioprinter is optionally connected to the internet.

Figure 2:
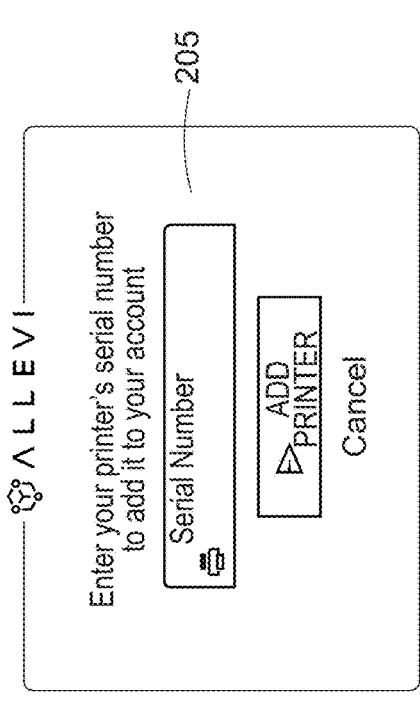
FIG. 2 illustrates a first portion of a user interface in accordance with aspects of the present disclosure.

FIG. 2 illustrates a first portion of a user interface in accordance with an aspect of the present disclosure. As illustrated, the user interface 115 may include a website that allows a user to view projects 201, and printers 203 that the user has access to. The user may also enter a serial number 205 for a bioprinter that the user wants to print with.

Figure 3:
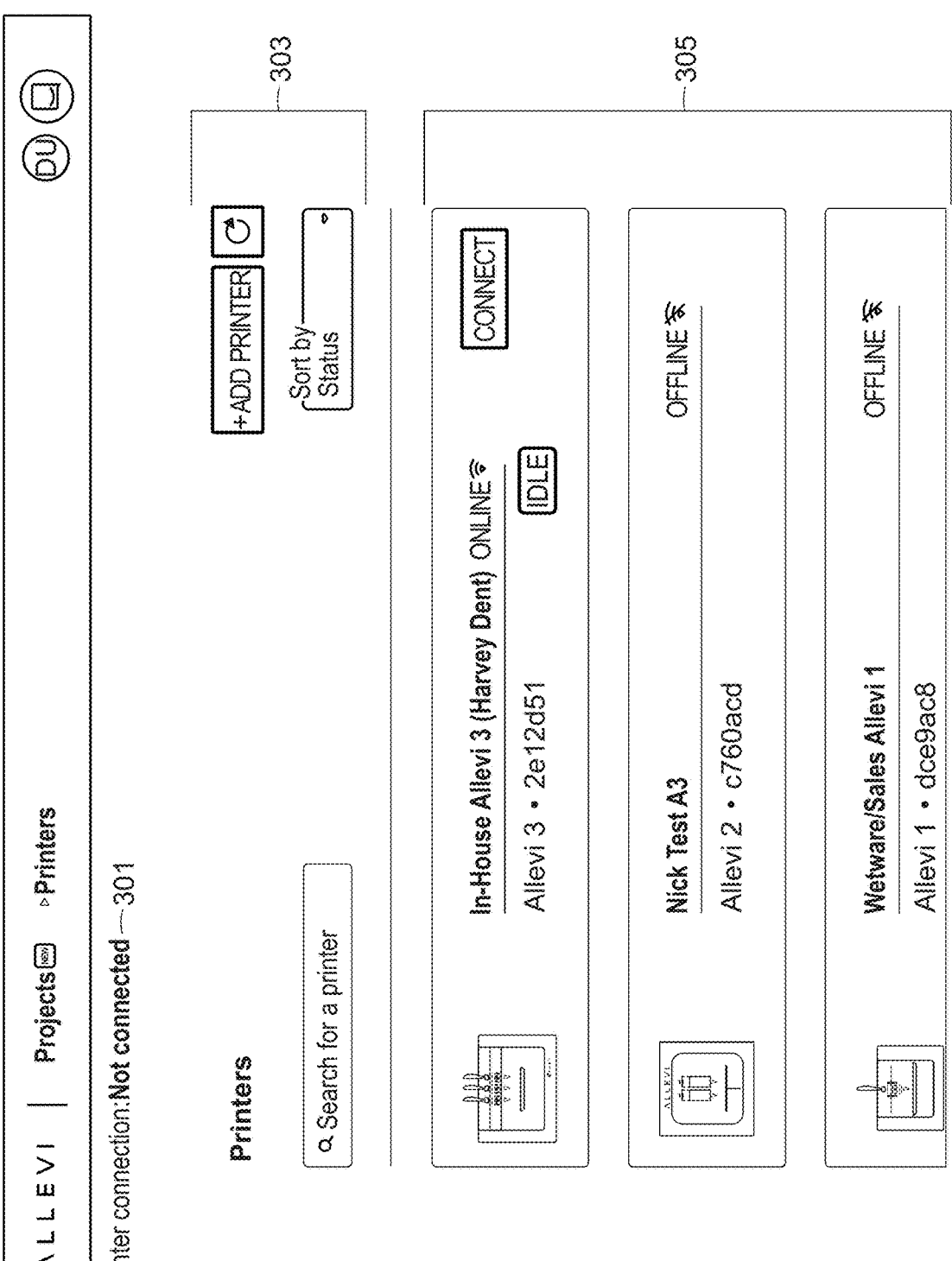
FIG. 3 illustrates a second portion of a user interface in accordance with aspects of the present disclosure.

FIG. 3 illustrates a second portion of a user interface in accordance with an aspect of the present disclosure. As illustrated in FIG. 3, the user may view all of the printers associated with the user's account 305. The interface may show any printers the user's device is currently connected with 301. The user may also be able to add a particular printer 303. Printers may be displayed by their name, current status (online/offline), model number and the like. The user may also be able to connect to or select a particular printer.

Figure 4:
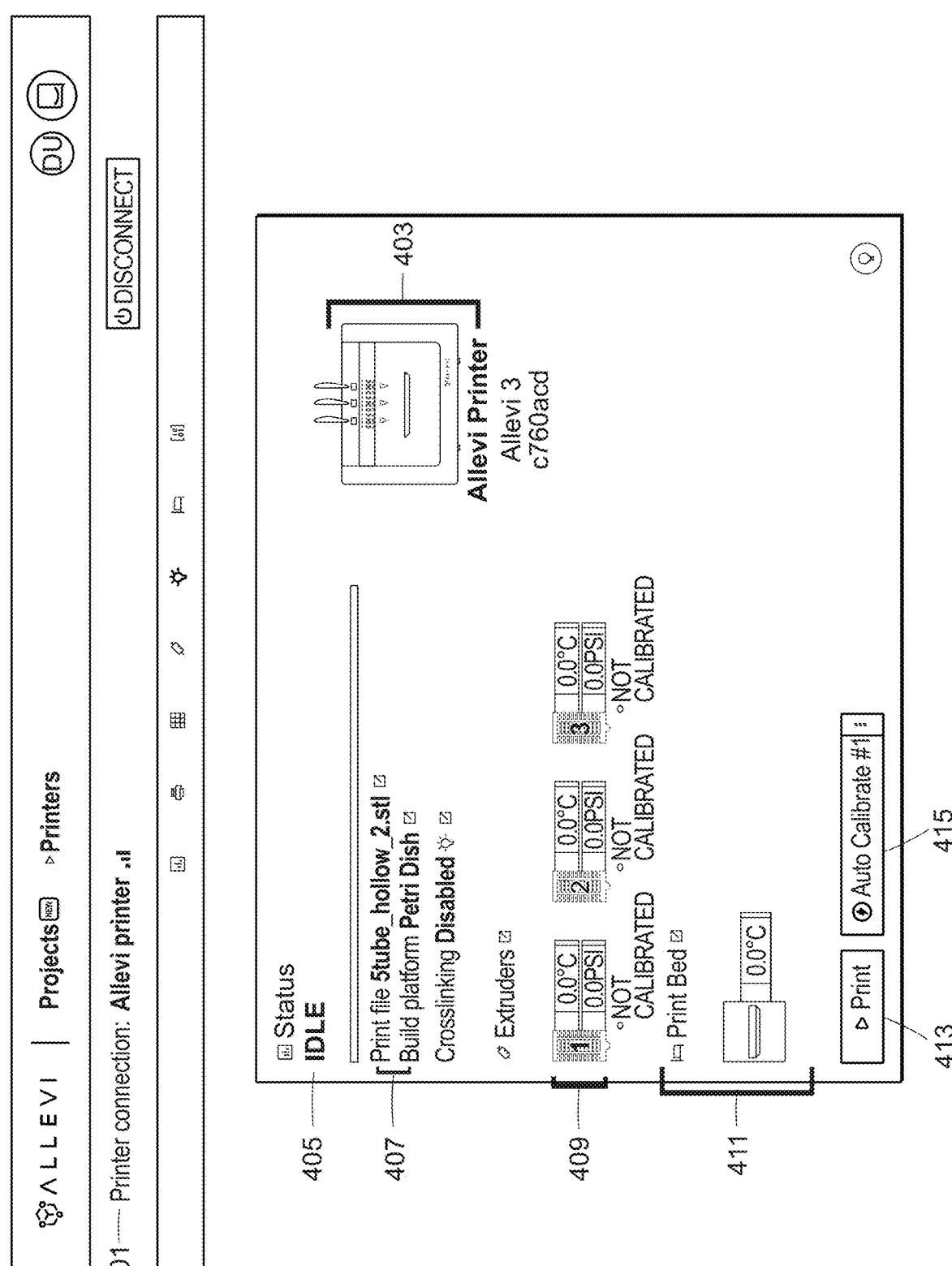
FIG. 4 illustrates a third portion of a user interface in accordance with aspects of the present disclosure.

FIG. 4 illustrates a third portion of a user interface in accordance with an aspect of the present disclosure. As illustrated in FIG. 4, the user may view a particular printer in further detail. The interface may indicate whether the printer is connected 401, the current status of the printer 405, and the printer information 403 (i.e., printer name, current status, model number and the like). The user may also view or upload a print file (a set of instructions for the printer). The user may also view or select a build platform (i.e., petri dish, well plate, glass slides, etc.) 407. The panel may also indicate whether a printer is currently configured to cross-link or if cross-linking functionality is disabled. The panel may also display the status for any extruders 409. Extruder information such as extruder temperature, contents, and pressure may also be displayed. The printer bed including information 411 regarding the temperature of the surface onto which the materials are bioprinted may also be displayed and/or set. The user may elect to command a bioprinter to print according to the print file using the print 413 option. Further, the user may command the bioprinter to auto-calibrate the extruders and/or print bed using auto-calibrate 415.

Calibration that accounts for variations in length and X/Y deflection between different syringes and needles used in bioprinting may be required to be executed prior to a print being executed. Calibration exists in two forms, manual calibration and automatic calibration. Automatic calibration such as auto-calibrate 415 can be performed by the printer without user intervention. Manual calibration requires user intervention. The calibration state may remain persistent for the duration of that print and any subsequent prints conducted during the current printer session. A printer session may be defined as the time a printer is switched on until it is switched off again. If multiple prints with varying calibration requirements are conducted during the same print session, calibration will need to be applied before each print is initiated. Changes to the print path and the calibration process are independent events and thus the print path can be changed at any time prior to it being executed.

Figure 5:
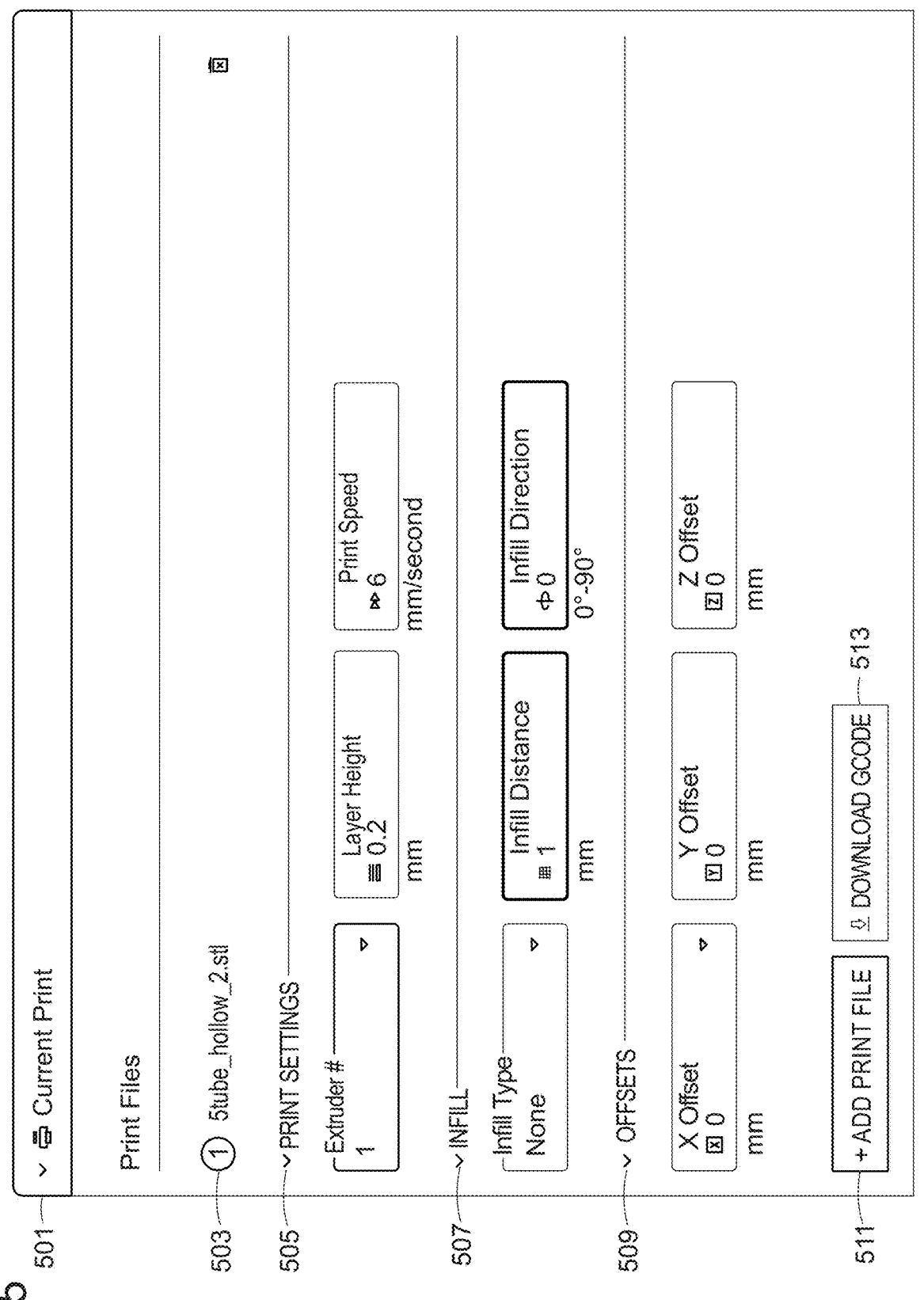
FIG. 5 illustrates a fourth portion of a user interface in accordance with aspects of the present disclosure.

FIG. 5 illustrates a fourth portion of a user interface in accordance with an aspect of the present disclosure. As illustrated in FIG. 5 print file information for the current print file associated with the printer may be displayed 501. Using the window illustrated in FIG. 5, a user may generate or load an existing print file 503. The print file may include print settings 505 that identify an extruder, the height of the layer deposited by the extruder, as well as the print speed (e.g., mm/sec). Additionally, the print file may include infill information 507 which includes the infill type (e.g., zigzag, grid, triangles, concentric, etc.), infill distance, and infill directions. Further, the print file may include offset information 509 including an x-offset, a y-offset, and a z-offset. Using the menu options, a user may add or generate a print file 511 based on the entered information. Further, a user may be able to download g-code information 513 based on the entered information.

Figure 6:
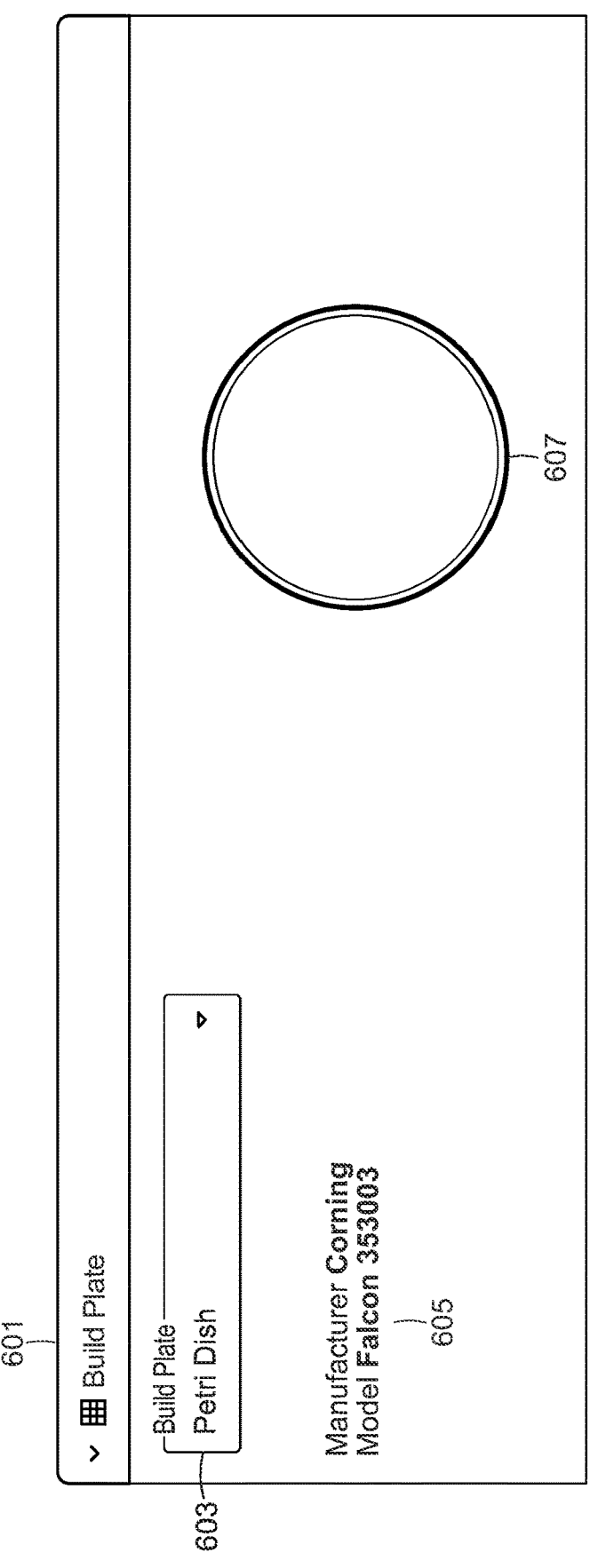
FIG. 6 illustrates a fifth portion of a user interface in accordance with aspects of the present disclosure.

FIG. 6 illustrates a fifth portion of a user interface in accordance with an aspect of the present disclosure. As illustrated in FIG. 6 the graphical user interface may allow a user to select information for a build plate 601. The build plate 603 may be a petri dish, well plate, and the like. After the build plate 603 is selected, the server system may update the user interface to display the manufacturer information (including manufacturer and model number) for a build plate 605. Further, the user interface may display a visual representation for the build plate 607.

Figure 7:
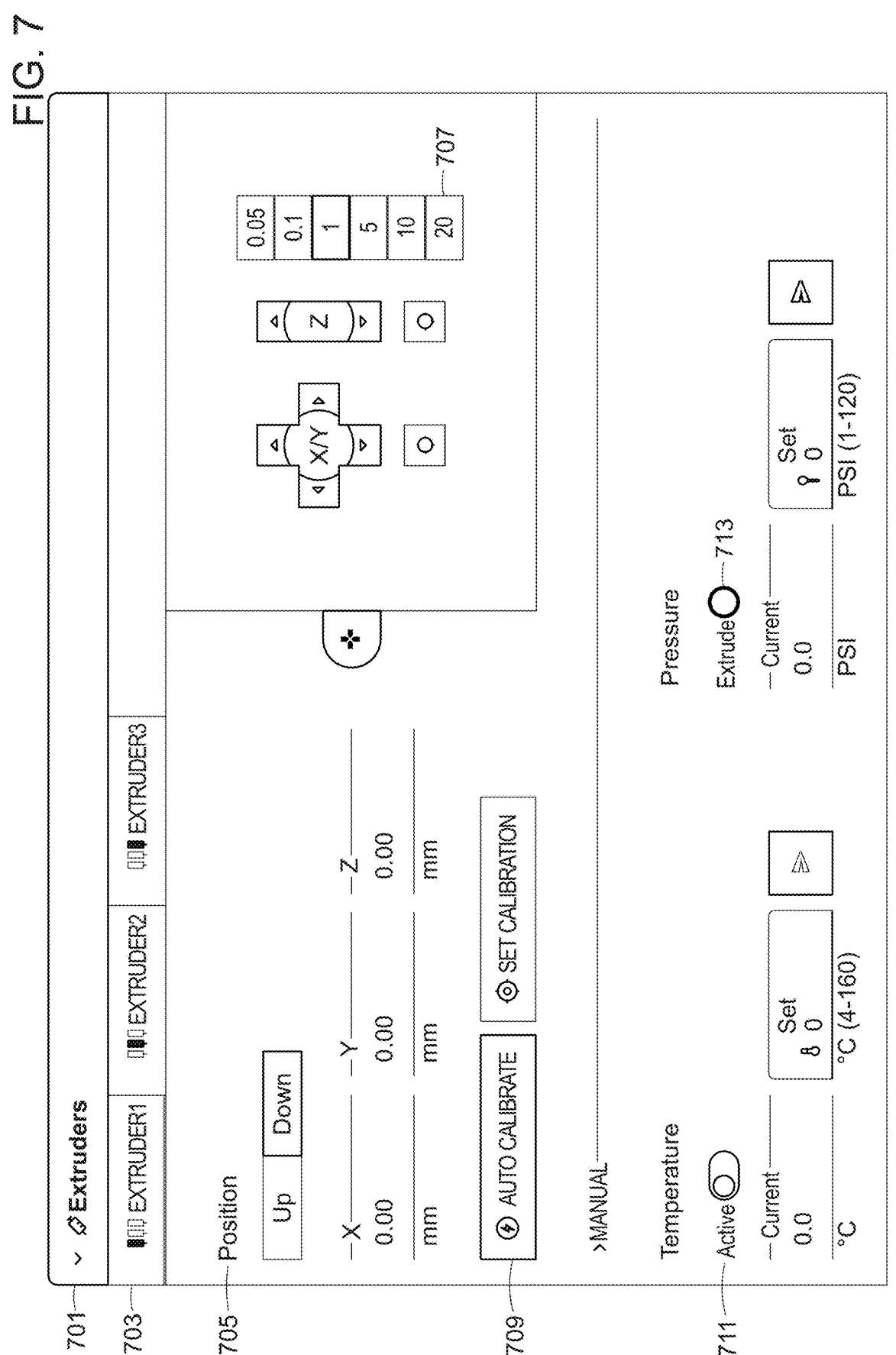
FIG. 7 illustrates a sixth portion of a user interface in accordance with aspects of the present disclosure.

FIG. 7 illustrates a sixth portion of a user interface in accordance with an aspect of the present disclosure. As illustrated in FIG. 7, the graphical user interface may allow a user to select and view more detailed information regarding the extruders 701. Additionally, the user may select a particular extruder 703 to command. Accordingly, the user may use the position menu 705 to move an extruder up and down, designate their position in x-y-z coordinates or auto-calibrate the extruder 709. Alternatively, or additionally, the user may manually navigate the extruder by commanding movement in any particular direction 707. Further, the user may be able to view and set the temperature of an extruder 711. The user may also be able to view and set the pressure of an extruder 713.

Figure 8:
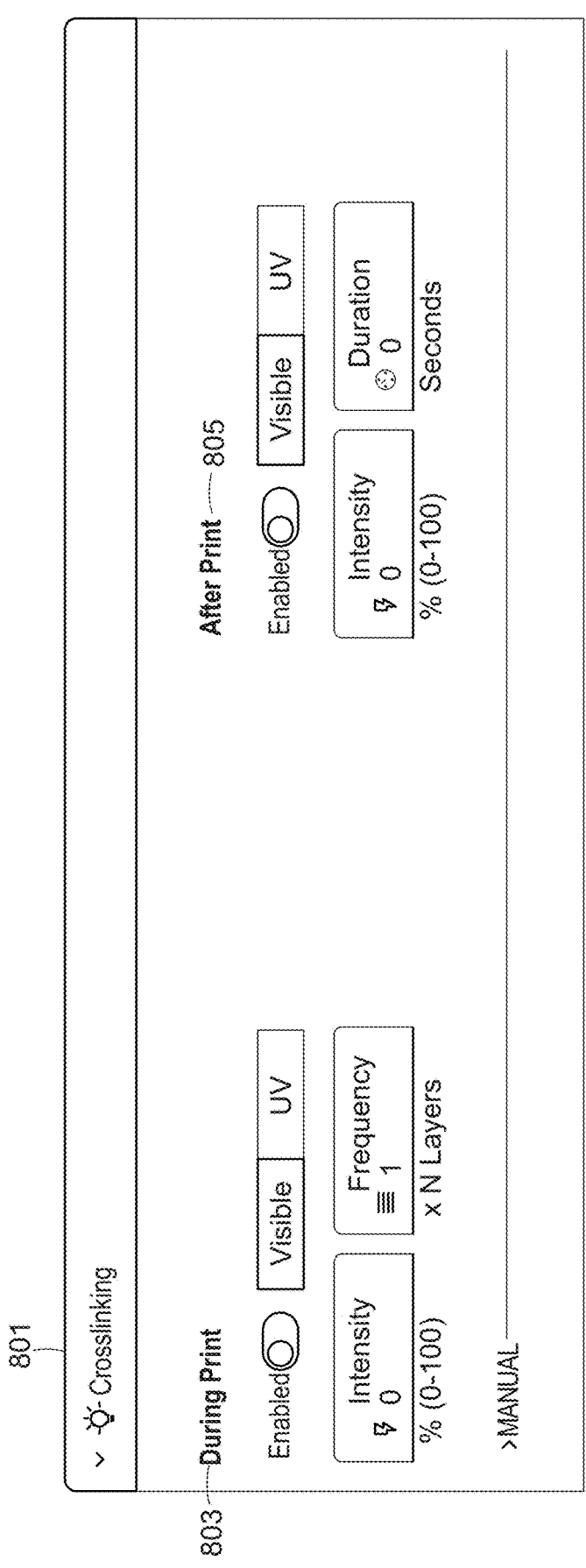
FIG. 8 illustrates a seventh portion of a user interface in accordance with aspects of the present disclosure.

FIG. 8 illustrates a seventh portion of a user interface in accordance with an aspect of the present disclosure. As illustrated in FIG. 8, using the user interface, the user may command cross-linking features of the bioprinter. For example, the user has the option of designating cross-linking during a print 803, including the use of visible or ultraviolet light, as well as the intensity, and frequency of the applied light. Further, the user has the option of designating cross-linking after a print 805, including the use of visible or ultraviolet light, as well as the intensity and duration of the applied light.

Figure 9:
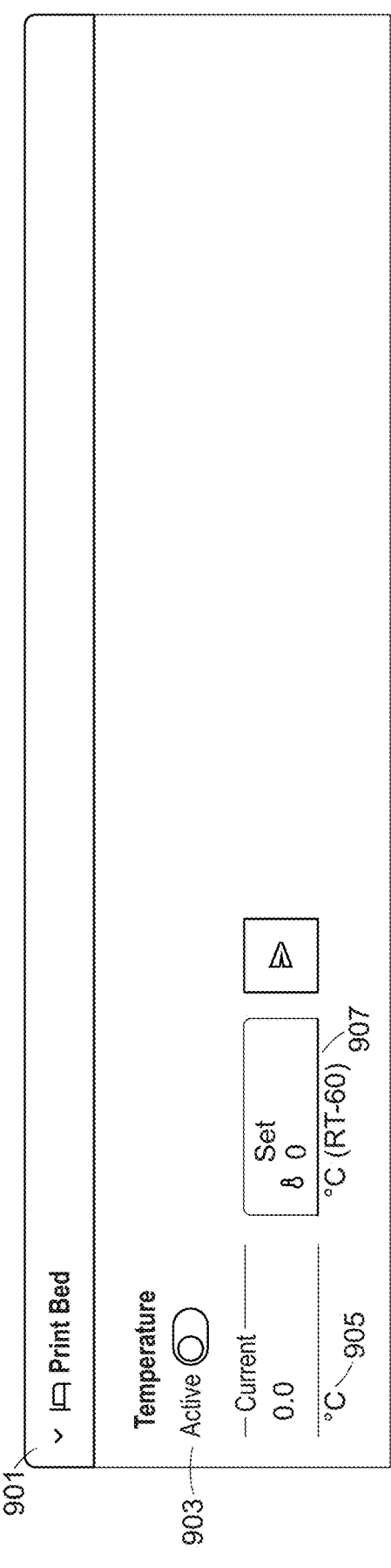
FIG. 9 illustrates an eighth portion of a user interface in accordance with aspects of the present disclosure.

FIG. 9 illustrates an eighth portion of a user interface in accordance with an aspect of the present disclosure. As illustrated in FIG. 9, the user may modify and/or set the features of the print-bed 501. For example, the temperature of the print-bed may be actively controlled 903. The graphical user interface may display the current temperature of the print-bed 905 as well as the target temperature for the print-bed 907.

Figure 10:
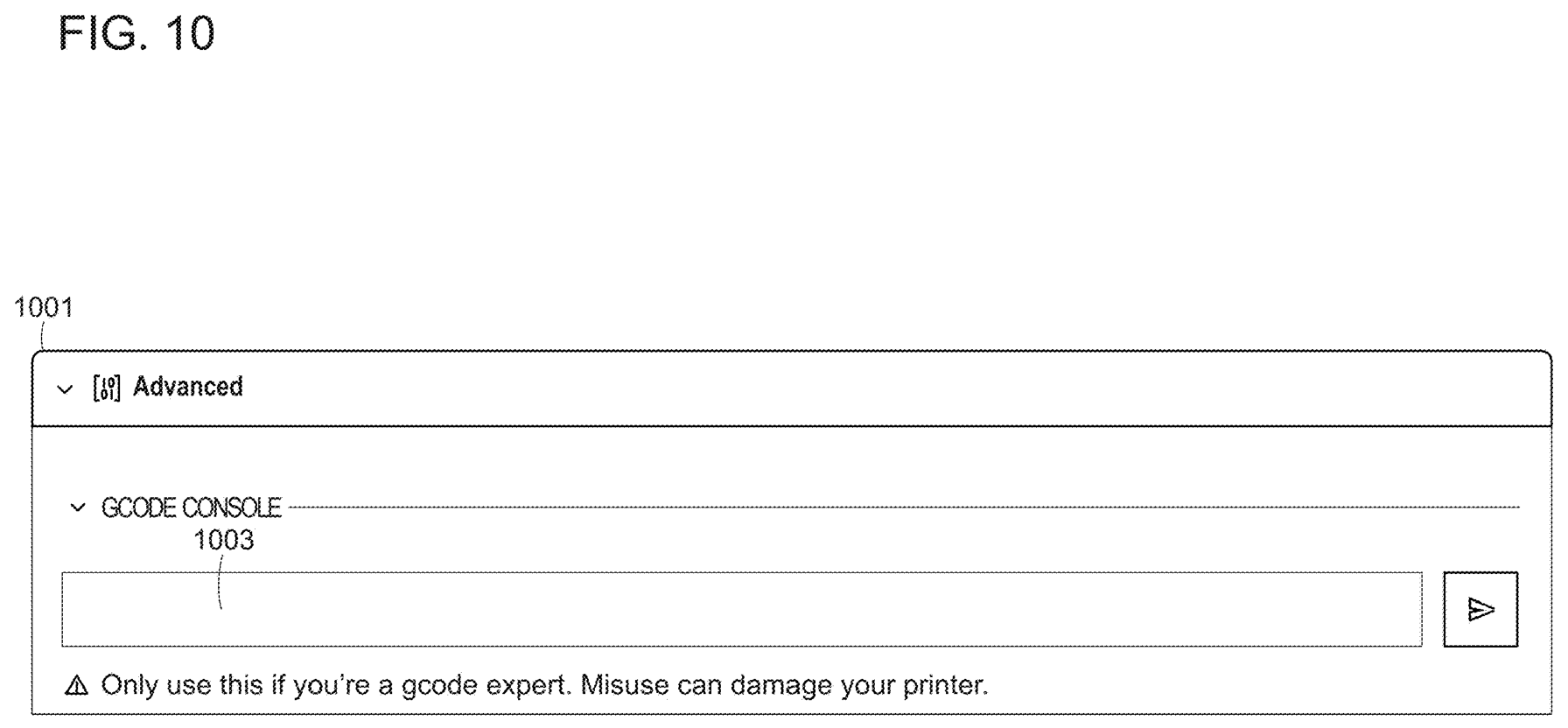

FIG. 10 illustrates a ninth portion of a user interface in accordance with an aspect of the present disclosure. As illustrated, the user may be provided with an advanced menu 1001, in which the user may enter g-code level commands. Accordingly, the user may directly interface with the bioprinter in some embodiments of the present disclosure.

Figure 11:
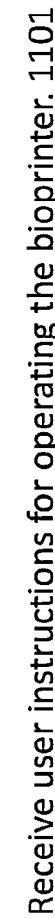
FIG. 11 illustrates a flowchart for a method for controlling bioprinters in accordance with aspects of the present disclosure.
Figure 11:
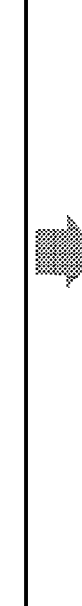
Figure 11:
Figure 11:
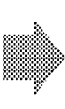

FIG. 11 illustrates a flowchart for a method for controlling bioprinters in accordance with an aspect of the present disclosure. The method of FIG. 11 may be performed by a server system such as those illustrated in FIGS. 1A-1C.

In a first step 1101, the server system may receive user instruction data for operating the bioprinter. User instruction data may define the parameters that are to be used when creating a print path. Examples of user instruction data may include, but are not limited to, 3D model files in stl or gcode format, printer configurations including serial number, module number and build number, extruder configurations including the type of extruder and its capabilities, well plate configurations including the number of wells, size specifications of each well and the well plate model/manufacturer, material configurations including material type and characteristics, commands such as specific commands the user wishes to send through to the printer in gcode format. The user instruction data may be provided via the user interface on a user computing device. For example, the user interface requests all possible data for each configuration and presents the user with a choice of which configuration to use (previously saved data) using a graphical user interface. Additionally, or alternatively, the user instruction data may be uploaded or crated based on user specifications submitted to the server infrastructure. Supported file formats may include gcode and stl files.

In some embodiments, the server system may be further configured to retrieve external data from communicatively coupled databases. Examples of external data includes printer data.

In a second step 1103, the server system may generate a path plan based on the received instructions. User specifications are defined either incrementally or all at once and then sent to the server system. The user specifications may be generated through the user interface and then saved in the database when the request is submitted to the server infrastructure. Once the user specifications are complete, they are provided as input parameters to a user specification to path data module on the server system. The user specifications may be validated to ensure they are of the correct type/structure. Once the specifications are validated, the module fetches the files from the file server/database corresponding to the specific bioprinter that is to be used.

In a third step 1105, the server system may generate machine language instructions for a bioprinter based on the generated path plan. In some embodiments, this may take place at a printer command generator module on a server system. The path data module on the server system may then send the completed path plan to the printer command generator module on the server system. The printer command generator module may convert the 3D model files into machine executable gcode files, customizing the files to contain commands adhere to the user specifications. As discussed above, the module may take 3D model files and slice them into 2D layers. When a printer executes the print path, it sequentially prints a layer before moving onto the next. Most commonly the bottom layer is printed first.

In a fourth step 1107, the server system may instruct a bioprinter in accordance with the generated machine language instructions. Once the machine language level file is generated by the printer command generator the output file may be stored in the file server and/or database. The user may be notified by way of a user interface on a user computer device, that the conversion is complete. The user may be sent either the output file or a url to the file that can be used to download the converted file into the user computing device. Alternatively, the output file may be sent directly to a bioprinter.

Embodiments of the present disclosure may allow for the precise motion patterns that accommodate for the heating and variations in machine movement due to printing. The path plan and all patterns and changes required during a print are completely defined during the printer command generation process. Parameters that can influence the path plan (e.g. layer height, print speed, extruder position at a certain point in time) may be used by the slicing algorithm and configured into the output. The conversion of a 3D model to a 2D layer will be converted in such a way that the commands that specify how the layer is printed incorporate the parameters that have been specified. Parameters that influence the path plan but cannot be integrated into the converted output by the slicing algorithm (e.g. the well in which a file should be printed in, pressure/temperature targets that need to be met before a file can be printed) are specified before or after the converted output. They are in gcode format and may be pre/appended to the output file or sent as additional commands before or after the output file.

In conventional systems, users had to manually edit low-level G-code for each bioprinter, in a process that was laborious, error-prone, and time-consuming. This was due in fact that in conventional printing systems, a would be required to upload a gcode file that will be sent to a printer and sequentially executed until the print was completed. While the user provided gcode file in conventional systems contained information to print the model, it did not allow for customization. By contrast, the systems and methods described herein are able to be customized for well plate configurations (e.g., printing the model in a specific well, replicating the model multiple times in different wells), extruder configurations (e.g., extruder parameters including temperature and pressure for each copy), file configurations (e.g., printing different 3D models), material configurations (e.g., different materials or combinations thereof), printer configurations (e.g., printing the same model on different printers) and the like. In a conventional system, each of these customizations would need to be entered, in gcode, into the model file before the printer can begin executing the print.

By contrast, the disclosed system decouples the user specifications from the path generation. User specifications allow for the customization of printer commands by way of a user interface that also allows for an intuitive user input mechanism, saves previous customizations, and allows for the creation of new customizations. Advantageously, the resulting user specifications are stored as stl or gcode files that ensure that the user does not need to use a separate slicing application to generate gcode files. The printer command generation module uses the user specifications to add in the commands that a user in a conventional system would have to add in by hand. In some embodiments, since the same server system is used to communicate with the printer, the commands/output files can be sent directly to the printer from the user interface negating the need for the user to transfer the files manually to the printer.

The disclosed systems and methods provide a single end-to-end system for the creation, customization and reproducibility of prints without the user requiring any external software or additional knowledge. Additionally, the disclosed systems and methods provide the user with a choice of using an internet connected printer or having a completely disconnected printer.

Figure 12:
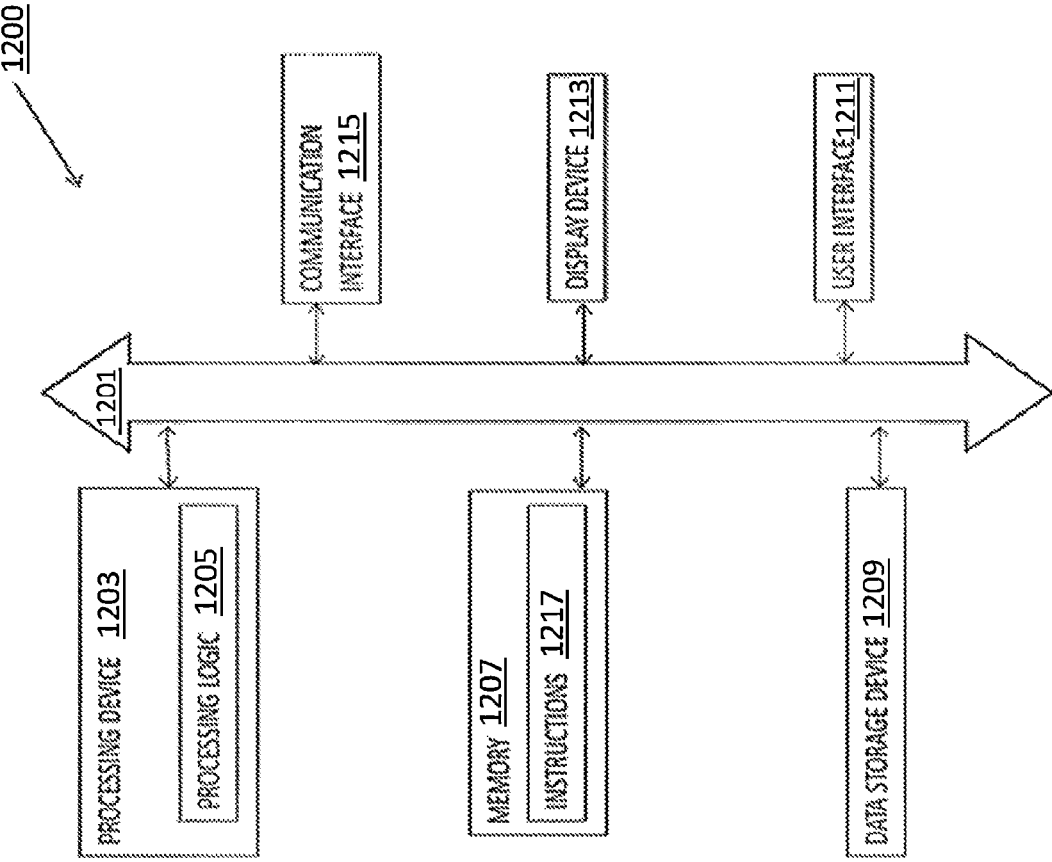
FIG. 12 illustrates a computer architecture diagram in accordance with aspects of the present disclosure.

FIG. 12 illustrates a functional block diagram of a machine in the example form of computer system 1200, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. Still further, data flow between the server system and machines can be in any direction. For example, data may flow in the form of instruction from the network being sent to the machine. And, data may also flow from the machine back to the data storage device. In some examples, each of the server system 113A-C of FIGS. 1A-1C may be implemented by the example machine shown in FIG. 12 (or a combination of two or more of such machines).

Example computer system 1200 may include processing device 1203, memory 1207, data storage device 1209 and communication interface 1215, which may communicate with each other via data and control bus 1201. In some examples, computer system 1200 may also include display device 1213 and/or user interface 1211.

Processing device 1203 may include, without being limited to, a microprocessor, a central processing unit, an application specific integrated circuit (ASIC), a field programmable gate array (FPGA), a digital signal processor (DSP) and/or a network processor. Processing device 1203 may be configured to execute processing logic 1205 for performing the operations described herein. In general, processing device 1203 may include any suitable special-purpose processing device specially programmed with processing logic 1205 to perform the operations described herein.

Memory 1207 may include, for example, without being limited to, at least one of a read-only memory (ROM), a random access memory (RAM), a flash memory, a dynamic RAM (DRAM) and a static RAM (SRAM), storing computer-readable instructions 1217 executable by processing device 1203. In general, memory 1207 may include any suitable non-transitory computer readable storage medium storing computer-readable instructions 1217 executable by processing device 1203 for performing the operations described herein. Although one memory device 1207 is illustrated in FIG. 12, in some examples, computer system 1200 may include two or more memory devices (e.g., dynamic memory and static memory).

Computer system 1200 may include communication interface device 1211, for direct communication with other computers (including wired and/or wireless communication), and/or for communication with network 103A-C (see FIGS. 1A-1C). In some examples, computer system 1200 may include display device 1213 (e.g., a liquid crystal display (LCD), a touch sensitive display, etc.). In some examples, computer system 1200 may include user interface 1211 (e.g., an alphanumeric input device, a cursor control device, etc.). In some instances, the computer and interface can be located on the bioprinter itself.

In some examples, computer system 1200 may include data storage device 1209 storing instructions (e.g., software) for performing any one or more of the functions described herein. Data storage device 1209 may include any suitable non-transitory computer-readable storage medium, including, without being limited to, solid-state memories, optical media and magnetic media.

Modules may include specially configured hardware and/or software components. In general, the word module, as used herein, may refer to logic embodied in hardware or firmware or to a collection of software instructions. Generally, the modules described herein refer to logical modules that may be combined with other modules or divided into sub-modules despite their physical organization or storage.

In some examples, some or all of the logic for the above-described techniques may be implemented as a computer program or application or as a plug-in module or sub-component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

We claim:

1. A network-based system for three-dimensional bioprinting, the system comprising:
   a server comprising:
      a user specification to path data module configured to generate a path plan data based on received user specification data, the user specification data comprising instructions for a desired print structure; and
      a printer command generator module configured to generate bioprinter machine commands for a plurality of bioprinters each configured to print the desired print structure, the printer command generator module generating bioprinter machine commands based on the generated path plan data by:

converting the path plan data into first machine commands customized for a first bioprinter model of the plurality of bioprinters, and converting the path plan data into second machine commands customized for a second bioprinter model of the plurality of bioprinters, wherein the bioprinter machine commands are configured to control an extrusion-based bioprinter in extruding biomaterial based on the path plan data.

2. The system of claim 1, wherein the server comprises:

a printer to user-readable module configured to:

retrieve or receive data from a bioprinter, and provide status updates for the bioprinter to a user interface of a user computing device.

3. The system of claim 1, comprising:

a database communicatively coupled to the server, wherein the database is configured to store at least one of bioprinter configuration data, well plate configuration data, extruder configuration data, and material configuration data.

4. The system of claim 1, wherein the server is communicatively coupled to a user computing device configured to generate user specification data.

5. The system of claim 4, wherein the user specification data comprises at least one of printer configuration, well plate configuration, extruder configuration, material configuration, file configuration, print configuration, and reproducibility configurations.

6. The system of claim 4, comprising:

a bioprinter communicatively coupled to the user computing device configured to generate a three-dimensional bioprint based on bioprinter machine commands generated by the server.

7. The system of claim 6, wherein the bioprinter is communicatively coupled to the user computing device over at least one of a local area network and USB connection.

8. The system of claim 1, comprising:

a bioprinter communicatively coupled to the server and configured to generate a three-dimensional bioprint based on the bioprinter machine commands generated by the server.

9. A method for three-dimensional bioprinting, the method comprising:

receiving, at a server system, user specification data indicative of a three-dimensional bioprint target from a user computing device communicatively coupled to the server system;

generating, via the server system, a path plan for a bioprinter device based on the received user specification data, the user specification data comprising instructions for a desired print structure; and generating, via the server system, bioprinter commands for a plurality of bioprinters each configured to print the desired print structure, the bioprinter commands generated based on the generated path plan by:

converting the path plan data into first machine commands customized for a first bioprinter model of the plurality of bioprinters, and converting the path plan data into second machine commands customized for a second bioprinter model of the plurality of bioprinters, wherein the bioprinter commands are configured to control an extrusion-based bioprinter in extruding biomaterial based on the generated path plan.

10. The method of claim 9, wherein user specification data comprises at least one of printer configuration, well plate configuration, extruder configuration, material configuration, file configuration, print configuration, and reproducibility configurations.

11. The method of claim 9, comprising:

generating user specification data by input into a user interface displayed on the user computing device.

12. The method of claim 9, wherein generating the path plan comprises:

incorporating bioprinter characteristic data with the user specification data.

13. The method of claim 9, comprising:

applying the generated bioprinter commands to a bioprinter communicatively coupled to the server system to print the three-dimensional bioprint target.

14. The method of claim 9, comprising:

transmitting the bioprinter commands to the user computing device for application to a bioprinter communicatively coupled to the user computing device to print the three-dimensional bioprint target.

15. The system of claim 1, wherein the user specification to path data module is configured to generate the path plan data by:

slicing the user specification data into a plurality of slices, generating a path plan for each slice, and combining the path plans of the plurality of slices into the path plan data.

16. A network-based system for three-dimensional bioprinting, the system comprising:

a server comprising:

a user specification to path data module configured to generate a path plan data based on received user specification data, the user specification data comprising instructions for a desired print structure; and a printer command generator module configured to generate bioprinter machine commands for a plurality of bioprinters each configured to print the desired print structure, the printer command generator module generating bioprinter machine commands based on the generated path plan data by:

converting the path plan data into first machine commands customized for a first bioprinter model of the plurality of bioprinters, and converting the path plan data into second machine commands customized for a second bioprinter model of the plurality of bioprinters, wherein the bioprinter machine commands are configured to control an extrusion-based bioprinter machine in extruding biomaterial based on the path plan data; and a user computing device communicatively coupled to the server, wherein the user computing device is configured to:

generate user specification data and provide the user specification data to the server;

receive the bioprinter machine commands from the server; and control operation of the extrusion-based bioprinter machine in extruding biomaterial, the extrusion-based bioprinter machine communicatively coupled to the user computing device by way of the bioprinter machine commands.

17. The system of claim 16, wherein the user specification data comprises at least one of printer configuration, well plate configuration, extruder configuration, material configuration, file configuration, print configuration, and reproducibility configurations.

18. The system of claim 16, wherein the bioprinter machine is communicatively coupled to the user computing device over at least one of a local area network and USB connection.

19. The system of claim 16, wherein the user specification to path data module is configured to incorporate bioprinter characteristic data with the user specification data to generate the path plan data.

20. The system of claim 16, wherein the printer command generator module generates the bioprinter machine commands by splicing the path plan data.

* * * * *